US008693379B2

(12) United States Patent
Nishioka et al.

(10) Patent No.: US 8,693,379 B2
(45) Date of Patent: Apr. 8, 2014

(54) COMMUNICATION SYSTEM, COMMUNICATION DEVICE, AND COMMUNICATION METHOD

(75) Inventors: Shinichiro Nishioka, Osaka (JP); Tsutomu Sekibe, Kanagawa (JP)

(73) Assignee: Panasonic Corporation, Osaka (JP)

(*) Notice: Subject to any disclaimer, the term of this patent is extended or adjusted under 35 U.S.C. 154(b) by 571 days.

(21) Appl. No.: 12/676,433

(22) PCT Filed: Jul. 21, 2009

(86) PCT No.: PCT/JP2009/003403
§ 371 (c)(1),
(2), (4) Date: Mar. 4, 2010

(87) PCT Pub. No.: WO2010/010686
PCT Pub. Date: Jan. 28, 2010

(65) Prior Publication Data
US 2010/0202329 A1   Aug. 12, 2010

(30) Foreign Application Priority Data
Jul. 22, 2008  (JP) .................. 2008-189112

(51) Int. Cl.
*H04L 5/16* (2006.01)
(52) U.S. Cl.
USPC ........................................ 370/296
(58) Field of Classification Search
USPC ................... 370/252, 255, 271, 276, 296
See application file for complete search history.

(56) References Cited

U.S. PATENT DOCUMENTS

| 4,771,417 A | 9/1988 | Maxwell et al. |
| 5,155,726 A | 10/1992 | Spinney et al. |
| 5,305,306 A | 4/1994 | Spinney et al. |
| 5,920,705 A | 7/1999 | Lyon et al. |
| 7,054,947 B2 | 5/2006 | Yun |
| 8,089,907 B2 | 1/2012 | Pannell et al. |
| 2002/0124102 A1* | 9/2002 | Kramer et al. ............. 709/234 |
| 2002/0133631 A1 | 9/2002 | Yun |
| 2004/0022204 A1 | 2/2004 | Trembley |
| 2004/0027998 A1 | 2/2004 | Palm |

(Continued)

FOREIGN PATENT DOCUMENTS

| CN | 1509441 | 6/2004 |
| EP | 1 220 480 | 7/2002 |

(Continued)

OTHER PUBLICATIONS

International Search Report issued Aug. 18, 2009 in International (PCT) Application No. PCT/JP2009/003403.

(Continued)

*Primary Examiner* — Yemane Mesfin
*Assistant Examiner* — Mon Cheri Davenport
(74) *Attorney, Agent, or Firm* — Wenderoth, Lind & Ponack, L.L.P.

(57) ABSTRACT

A communication system performs communication while switching between full-duplex communication and half-duplex communication. A slave device, which receives command packet signals requesting to write or read data from the master device, stores information in a response packet signal that specifies half-duplex communication in response to one of the received packet signals, and transmits the response packet signal to the master device, when the number of the received command packet signals has reached the maximum number of the command packet signals storable in a command signal queue.

10 Claims, 11 Drawing Sheets

(56) References Cited

U.S. PATENT DOCUMENTS

| | | | |
|---|---|---|---|
| 2004/0133717 | A1 | 7/2004 | Tashiro |
| 2005/0063322 | A1 | 3/2005 | Palm |
| 2005/0201305 | A1 | 9/2005 | Shibata et al. |
| 2006/0039399 | A1* | 2/2006 | Ejima .......................... 370/445 |
| 2006/0224800 | A1 | 10/2006 | Tashiro |

FOREIGN PATENT DOCUMENTS

| | | |
|---|---|---|
| EP | 1 477 901 | 11/2004 |
| JP | 8-111761 | 4/1996 |
| JP | 2001-86104 | 3/2001 |
| JP | 2001-86185 | 3/2001 |
| JP | 2002-94600 | 3/2002 |
| JP | 2002-271445 | 9/2002 |
| JP | 2003-242470 | 8/2003 |
| JP | 2005-260361 | 9/2005 |
| JP | 2006-20224 | 1/2006 |
| JP | 2006-60403 | 3/2006 |

OTHER PUBLICATIONS

Office Action dated May 8, 2012 in U.S. Appl. No. 12/665,079.
Office Action dated May 10, 2012 in U.S. Appl. No. 12/674,045.

* cited by examiner

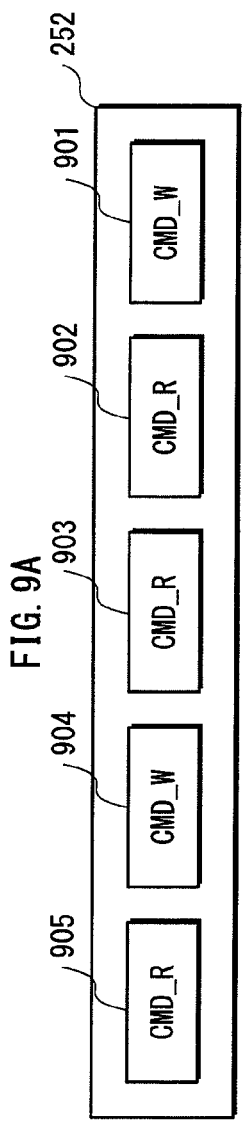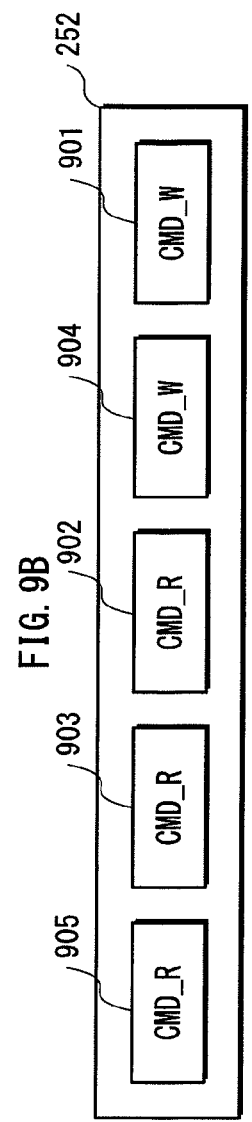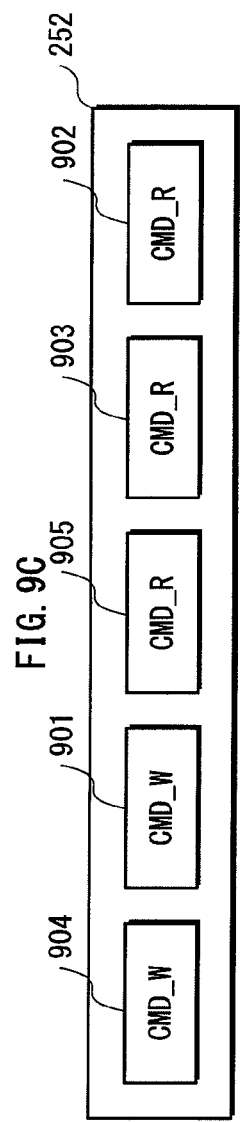

COMMUNICATION SYSTEM, COMMUNICATION DEVICE, AND COMMUNICATION METHOD

BACKGROUND OF INVENTION

1. Technical Field

The present invention relates to a communication system for performing communication via handshaking, and to a selection of a communication scheme between communication devices.

2. Background Art

In data communication between devices, some devices perform full-duplex communication and other devices perform half-duplex communication.

Full-duplex communication is a communication scheme that allows, in two-way communication, both devices to transmit and receive data simultaneously. Full-duplex communication offers the following advantages: it is not necessary to switch between transmission and reception; it is easy to control full-duplex communication; and data transmission and reception may be performed anytime.

On the other hand, half-duplex communication is a communication scheme that, unlike the two-way communication, does not allow both devices to transmit and receive data simultaneously, and simply allows one of the devices to transmit data to the other in an allocated time. Half-duplex communication is advantageous than full-duplex communication in terms of a large capacity data transfer. For, in half-duplex communication, it is not necessary, during data transmission, to secure a bandwidth for data reception as needed in full-duplex communication, and a wider bandwidth for data transmission becomes available than the case of full-duplex communication.

Since full-duplex communication and half-duplex communication each provide different advantages, there have been disclosed in Patent Literature 1 communication devices and a communication method, which are designed to switch between full-duplex communication and half-duplex communication. According to Patent Literature 1, (i) when one of two devices requests to transmit data, half-duplex data communication is performed, and (ii) when both two devices request to transmit data, full-duplex data communication is performed.

CITATION LIST

Patent Literature

Patent Literature 1: Japanese patent application publication No. 2002-94600

SUMMARY OF INVENTION

Meanwhile, in Patent Literature 1, half-duplex data communication is performed all the time when only one of the communication devices requests to transmit data. Therefore, in such cases during half-duplex data communication, a problem occurs that hinders a data receiving device from outputting a new command signal for requesting data communication.

The object of the present invention is to solve the above drawback. In other words, the present invention aims to provide a communication system that makes it possible to switch from full-duplex communication to half-duplex communication appropriately, so that it can be prevented that, during half-duplex data communication, the data receiving device cannot transmit a command signal that requests a new data communication as mentioned above.

In order to solve the above drawback, the present invention provides a communication system that includes first and second communication devices that are capable of performing full-duplex communication and half-duplex communication with each other via handshaking, wherein the first communication device includes (i) a command signal transmission unit operable to transmit a command signal for requesting data communication to the second communication device via a channel, which is used for data transmission from the first to second communication device in full-duplex communication, and (ii) a first data communication unit operable to receive, from the second communication device, a response signal in response to the command signal, and perform data communication according to a communication scheme specified by the response signal, the second communication device includes (i) a command signal storage unit that stores therein each command signal transmitted from the first communication device and that has a maximum number of command signals storable therein, (ii) a response signal transmission unit operable to transmit a response signal that specifies either a full-duplex communication scheme or a half-duplex communication scheme, and (iii) a second data communication unit operable to perform data communication, and the response signal transmission unit transmits the response signal that specifies the half-duplex communication scheme, when the number of the command signals, which have been stored in the command signal storage unit and whose corresponding data communication has not been executed, has reached the maximum number.

Further, one aspect of the present invention is a communication method that includes first and second communication devices which are capable of performing full-duplex communication and half-duplex communication via handshaking, comprising the steps of: transmitting a command signal for requesting data communication from the first to the second communication device via a channel, which is used for data transmission from the first to second communication device in full-duplex communication; storing each command signal transmitted from the first communication device in a command signal storage unit that stores therein each command signal received by the second communication device and that has a maximum number of command signals storable therein; transmitting, in response to the command signal, a response signal that specifies either a full-duplex communication scheme or a half-duplex communication scheme; and receiving a response signal in response to the command signal, and performing data communication according to a communication scheme specified by the response signal, wherein in the response signal transmitting step, the response signal that specifies the half-duplex communication scheme is transmitted, when the number of the command signals, which have been stored in the command signal storage unit and whose corresponding data communication has not been executed, has reached the maximum number.

This allows the second communication device, when the number of the command packet signals stored in the command signal storage unit has reached the maximum number storable in the command signal storage unit, to transmit a response signal that specifies half-duplex communication as the communication scheme. The second communication device executes each data communication corresponding to each command signal that has been received and stored. However, when the number of the command packet signals stored in the command signal storage unit has reached the maximum number, it is not possible for the second communication device to receive a command signal anymore. Under such a circumstance, it is no use for the first communication device to transmit a command signal to the second communication device, and so there is no problem if the first communication device may not transmit any command signal to the second communication device. Accordingly, the second communication device properly specifies half-duplex data communication as a communication scheme.

Further, in the communication system, the first communication device may further include a hold unit that holds the maximum number, and the first data communication unit may perform half-duplex data communication, when (i) the number of the command signals, which have been transmitted from the command signal transmission unit and whose corresponding data communication has not been executed, equals to the maximum number, and (ii) receiving the response signal that specifies half-duplex communication in response to one of the command signals.

This allows the first communication device to perform half-duplex communication all the time when the number of the stored command packet signals has reached the maximum number storable in the command signal storage unit of the second communication device.

Further, in the communication system, the first communication device may further include a hold unit that holds the maximum number, and an instruction signal transmission unit operable to transmit an instruction signal that instructs the first and second communication devices to perform half-duplex data communication, when (i) the number of the command signals, which have been transmitted from the command signal transmission unit and whose corresponding data communication has not been executed, equals to the maximum number, and (ii) receiving the response signal that specifies the half-duplex communication scheme in response to one of the command signals, the second communication device may further include an acknowledge signal transmission unit operable to transmit an acknowledge signal indicating that the second communication device approves to perform data communication in the communication scheme specified by the instruction signal, and upon receiving the acknowledge signal, the first data communication unit performs data communication in the specified communication scheme, and upon transmitting the acknowledge signal, the second data communication unit performs data communication in the specified communication scheme.

This allows each of the first and second communication devices to perform half-duplex data communication while avoiding unwanted switching of communication.

Further, in the communication system, the command signal transmission unit may house a prescribed information in the command signal that is to be transmitted, and upon receiving the command signal containing the prescribed information, the response signal transmission unit may transmit the response signal that specifies the half-duplex communication scheme, even when the number of the command signals stored in the command signal storage unit has not reached the maximum number.

This allows the first communication device to cause the second communication device to select half-duplex data communication by housing a prescribed information in the command signal, even when the number of the stored command packet signals has not reached the maximum number storable in the command signal storage unit.

Further, in the communication system, the command signal transmission unit may house the prescribed information in the command signal that is to be transmitted, when there exists no other command signal that remains to be transmitted.

This allows the second communication device to transmit a response signal that specifies half-duplex data communication, even when the number of the stored command packet signals has not reached the maximum number storable in the command signal storage unit. Under the circumstance where there exists no other command signal that remains to be transmitted from the first communication device for the time being, it is no problem to switch to half-duplex communication. Accordingly, by performing half-duplex data communication under such a circumstance, the present invention makes it possible to raise a data transfer rate.

Further, in the communication system, the command signal may be either a data read request signal or a data write request signal, and the second data communication unit may execute data communication that corresponds to either data read request command signals or data write request command signals continuously, without relation to an order of storage of the command signals.

This allows the second communication device to perform data communication without relation to the order of reception of the command signals. By executing one of the data writing or reading intensively in the first place, the present invention makes it possible to reduce a switch frequency of the communication direction in half-duplex communication, thereby raise an overall data communication rate.

Further, another aspect of the present invention is a communication device that perform data transmission and reception with an other device, while switching between full-duplex communication and half-duplex communication, comprising: a command signal transmission unit operable to transmit a command signal for requesting data communication to the second communication device via a channel, which is used for data transmission from the first to second communication device in full-duplex communication; a limit value acquisition unit operable to acquire information of a maximum number of command packet signals storable in the other device; and a data communication unit operable to receive, from the second communication device, a response signal in response to the command signal, and perform data communication according to a communication scheme specified by the response signal, wherein the command signal transmission unit houses, in the command signal, information that specifies a half-duplex communication scheme, when the number of the command signals, which have been transmitted from the command signal transmission unit and whose corresponding data communication has not been executed by the data communication unit, has reached the maximum number.

This allows the communication device to request to switch the communication scheme to half-duplex communication, when the communication device is a command signal transmitting device, the communication device has acquired the maximum number of the command signals that the other device may receive, and the number of the transmitted command signals has reached the maximum number.

Further, yet another aspect of the present invention is a communication device that perform data transmission and reception with an other device, while switching between full-duplex communication and half-duplex communication, comprising: a command signal storage unit that stores therein each command signal transmitted from the other device and that has a maximum number of command signals storable therein; a response signal transmission unit operable to transmit a response signal that specifies either a full-duplex communication scheme or a half-duplex communication scheme;

and a second data communication unit operable to perform data communication, wherein the response signal transmission unit transmits the response signal that specifies the half-duplex communication scheme, when the number of the command signals, which have been stored in the command signal storage unit and whose corresponding data communication has not been executed, has reached the maximum number.

This allows the communication device to request half-duplex communication, when the communication device is a command signal receiving device, and the number of the received command signals has reached the maximum number of the command signals that may be held in the own device.

BRIEF DESCRIPTION OF DRAWINGS

FIG. 9A is a conceptual diagram showing command packet signals that have been accumulated in a command signal queue prior to ordering.

FIG. 9B is a conceptual diagram showing the command packet signals that have been accumulated in the command signal queue after ordering.

FIG. 9C is a conceptual diagram showing the command packet signals that have been accumulated in the command signal queue with priority.

DESCRIPTION OF INVENTION

Description will be made below on a communication system according to an embodiment of the present invention, with reference to figures.

First Embodiment

<Outline>

When two communication devices, which communicate via handshaking, perform data transmission and reception, the devices negotiate on which of full-duplex communication and half-duplex communication is to be used, select either full-duplex communication or half-duplex communication, and thereafter perform data communication by the selected communication scheme. Each of the devices includes a memory or a memory area for storing commands that request data communication. However, for a reason of a capacity of the memory or the memory area for storing the commands, there is a limit to the number of commands that one device may receive from the other. Accordingly, when the number of the received command signals has reached the maximum number of the receivable command signals, the other device transmits, in response to the data communication request from one device, a response packet signal that requests half-duplex data communication. Then, the devices perform half-duplex data communication.

<Structure>

Figure 1:
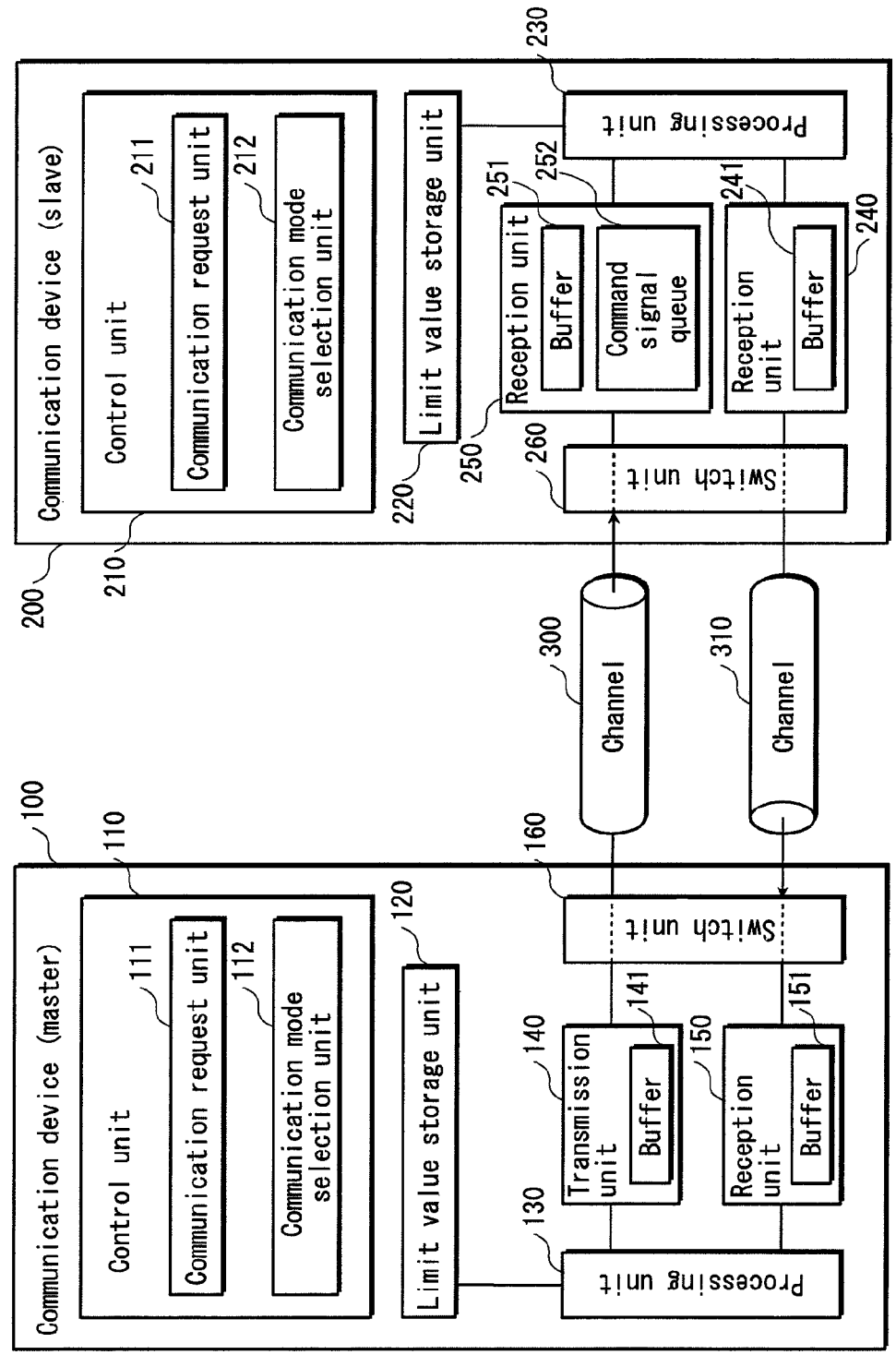
FIG. 1 is a functional block diagram showing a function structure of a communication system during full-duplex communication.

FIG. 1 is a functional block diagram showing a function structure of the communication system during full-duplex communication. As shown in FIG. 1, the communication system includes a communication device (master) 100, a communication device (slave) 200, and channels 300, 310 that connect the communication devices. The communication device 100 will be referred as the master 100, and the communication device 200 will be referred as the slave 200 below. Note that, although FIG. 1 shows the directions on the channels 300, 310 during full-duplex communication, when full-duplex communication is switched to half-duplex communication, the direction on one of the channels 300, 310 is to be reversed. Also, the channels 300, 310 are provided in the present embodiment only for easier comprehension of switching of the directions on the channels. Actually, for example, it is assumed that a set of the channels comprises a 2-bit data line, and the bandwidths on the channels are controlled as follows: (i) during full-duplex communication, a 1-bit data line is used as a down stream channel from the master 100 to the slave 200, and the other 1-bit data line is used as an upstream channel from the slave 200 to the master 100, and (ii) during half-duplex communication, the whole 2-bit data line is used as either the downstream channel from the master 100 to the slave 200 or the upstream channel from the slave 200 to the master 100. Alternatively, it is also assumed that the channels comprise a plurality of data lines so that some of the data lines are bound into an upstream channel and the other are bound into a down stream channel.

Figure 2:
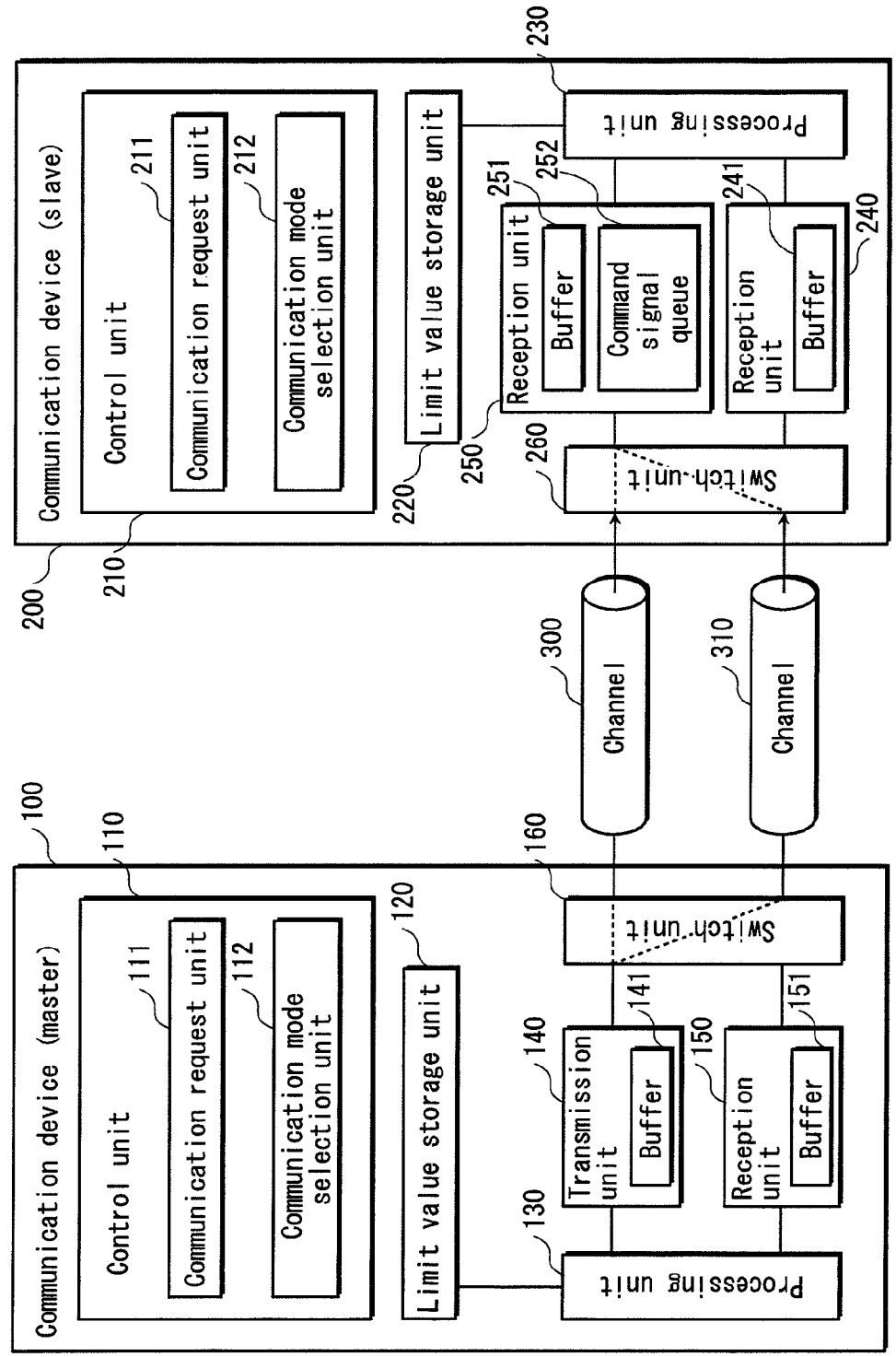
FIG. 2 is a functional block diagram showing a function structure of the communication system during the half-duplex communication, when a master 100 transmits data to a slave 200.

FIG. 1 shows the communication system in a full-duplex communication status. On the other hand, FIG. 2 shows the communication direction during half-duplex communication in which the master 100 transmits data to the slave 200. As shown in FIG. 2, when the master 100 transmits data to the slave 200 by half-duplex communication, a switch unit 160 routes the data to be transmitted, which was received from a transmission unit 140, to both the channels 300, 310. A switch unit 260 then delivers, to a reception unit 250, the data that has been received via the channels 300, 310.

Figure 3:
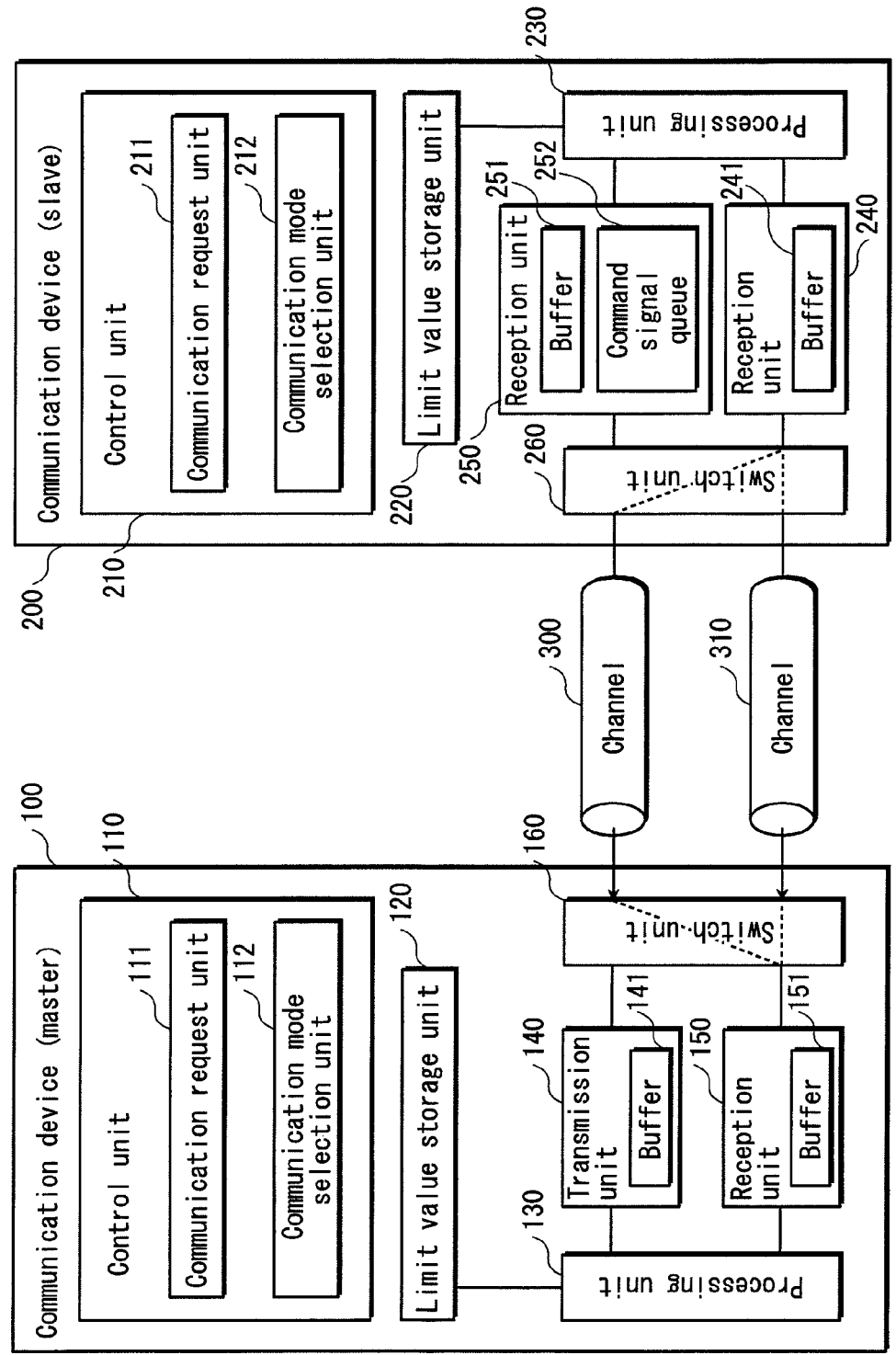
FIG. 3 is a functional block diagram showing a function structure of the communication system during the half-duplex communication, when the slave 200 transmits data to the master 100.

FIG. 3 also shows the communication direction during half-duplex communication, but presents the communication system in which the master 100 reads data from the slave 200. As shown in FIG. 3, when the master 100 reads data from the slave 200 by half-duplex communication, the switch unit 260 routes the data to be transmitted, which was received from a transmission unit 240, to both the channels 300, 310. The switch unit 160 then delivers, to a reception unit 150, the data that has been received via the channels 300, 310.

The master 100 includes a control unit 110, a limit value storage unit 120, a processing unit 130, the transmission unit 140, the reception unit 150, and the switch unit 160.

The control unit 110 includes a communication request unit 111 and a communication mode selection unit 112, and serves to execute processing with respect to the data that is to be transmitted or that has been received. The data processing executed by the control unit 110 herein includes (i) specifying the data that the master 100 is to write to the slave 200, (ii) specifying the data that the master 100 is to read from the slave 200, and (iii) storing the received data in the storage unit (not shown), such as a HDD, of the own device.

The communication request unit 111 serves to deliver, to the processing unit 130, a signal indicating that the master 100 requests data communication. The data communication request may be realized by an operator of the master 100 specifying the request, or by a predetermined program being executed.

The communication mode selection unit 112 serves, when the master 100 requests to write data to the slave 200, to select either a full-duplex communication scheme or a half-duplex communication scheme for the data communication, in accordance with (i) the total volume of the data to be transmitted, (ii) the accumulation rate at which data packet signals are accumulated from the processing unit 130 to the transmission unit 140, and (iii) the data transfer rate of the channels 300, 310. The communication mode selection unit 112 also serves, when the master 100 requests to read data from the slave 200, to select either the full-duplex communication scheme or the half-duplex communication scheme for the data communication, in accordance with (i) the total volume of the data to be received, (ii) the processing rate at which the processing unit 130 performs processing on the data packet signals stored in the reception unit 150, and (iii) the data transfer rate of the channels 300, 310. Further, the communication mode selection unit 112 also serves, when the communication mode indicated by the response packet signal differs from the communication mode indicated by the command packet signal that has been transmitted from the master 100, to select either the full-duplex communication scheme or the half-duplex communication scheme for the data communication, in accordance with a predetermined priority level. Here, the predetermined priority level may be, for example, priority on the master 100, that is to say, the communication scheme specified by the master 100 is to take priority over the communication scheme specified by the slave 200, or may be priority on half-duplex communication. The priority level is set depending on the environment in which the system is used.

The limit value storage unit 120 serves to store the maximum number of the command packet signals that a command signal queue 252 of the slave 200 may hold. The maximum number is housed in the response packet signal in response to an I/O command packet signal, transmitted from the slave 200 to the master 100, and stored, at the timing of initialization or reset of the communication, or reboot of the master 100 or the slave 200, or when the master 100 requests the slave 200 to transmit thereto the maximum number.

The processing unit 130 serves to (i) generate the command packet signals with respect to each data transmission or data reception as instructed by the control unit 110, and deliver each of the generated packet signals to the transmission unit 140, (ii) convert the data to be transmitted, which was delivered from the control unit 110, to data packet signals in a packet unit, and deliver each of the data packet signals to the transmission unit 140, and (iii) process the received data that has been stored in a buffer 151 of the reception unit 150, and deliver the processed data to the control unit 110.

The transmission unit 140 includes a buffer 141, and serves to accumulate therein the command packet signals, the data packet signals, and the like, which have been delivered from the processing unit 130, and deliver the signals accumulated in the buffer 141 to the switch unit 160 sequentially.

The reception unit 150 includes a buffer 151, and serves to accumulate therein the response packet signals, the data packet signals, or the like, which have been delivered from the switch unit 160, and deliver, to the processing unit 130, the signals accumulated in the buffer 151 sequentially.

The switch unit 160 serves to execute switching of the communication scheme between full-duplex communication and half-duplex communication in compliance with the instruction of the control unit 110. In full-duplex communication, the switch unit 160 serves to route, to the channel 300, the signals that have been delivered from the transmission unit 140, and deliver, to the reception unit 150, the signals that have been received via the channel 310. Meanwhile, when transmitting data by half-duplex communication, the switch unit 160 serves to route, to the channels 300, 310, the data that has been delivered from the transmission unit 140, and when receiving data by half-duplex communication, the switch unit 160 serves to route, to the reception unit 150, the data that has been received via the channels 300, 310. The switch unit 160, in fact, comprises two pairs of transmission and reception paths. In the first pair, each of the transmission and reception paths is connected to the channel 300 at one end thereof, and the transmission path is connected to the transmission unit 140 and the reception path is connected to the reception unit 150 at the other end thereof. In the second pair, each of transmission and reception paths is connected to the channel 310 at one end thereof, and the transmission path is connected to the transmission unit 140 and the reception path is connected to the reception unit 150 at the other end thereof. Each path includes thereon a switching device, such as a transistor that permits signals to pass according to the communication direction thereof when power is supplied. The switch unit 160 switches between transmission and reception, by switching the power supply to the switching devices, that is to say, by providing the power supply to the switching devices for one direction and cutting the power supply to the switching devices for the other direction.

Now, description will be made on the functions of various components of the slave 200.

The slave 200 includes a control unit 210, a limit value storage unit 220, a processing unit 230, a transmission unit 240, a reception unit 250, and a switch unit 260.

The control unit 210 includes a communication request unit 211 and a communication mode selection unit 212, and serves to execute processing with respect to the data that is to be transmitted or that has been received. The data processing executed by the control unit 210 herein includes (i) specifying the data that the master 100 is to write to the slave 200, (ii) specifying the data that the master 100 is to read from the slave 200, and (iii) storing the received data in the storage unit (not shown), such as a HDD, of the own device.

The communication request unit 211 serves to deliver, to the processing unit 230, a signal indicating that the slave 200 requests data communication. The data communication request may be realized by an operator of the slave 200 specifying the request, or by a predetermined program being executed.

The communication mode selection unit 212 serves to (i) determine whether half-duplex communication may be performed for data communication, in accordance with the data communication rate of the channels 300, 310, a buffer 251 capacity, and the processing rate at which the processing unit 230 processes the data that has been accumulated in the buffer 251, (ii) select either full-duplex communication or half-duplex communication, and (iii) deliver the selected communication scheme to the processing unit 230. The communication mode selection unit 212 also serves, when the number of the command packet signals held in the command signal queue 252 has reached the maximum number as held by the limit value storage unit 220.

The limit value storage unit 220 serves to store the maximum number of the command packet signals that the command signal queue 252 of the slave 200 may hold. The maximum number is read by the processing unit 230, transmitted to the master 100 via the transmission unit 250 and the switch unit 260, at the timing of initialization or reset of the communication, or reboot of the master 100 or the slave 200.

The processing unit 230 serves to (i) analyze each of the command packet signals, generate the response packet signals in response to the command packet signals, and deliver each of the generated response packet signals to the transmission unit 240, (ii) convert the data to be transmitted, which has been delivered from the control unit 210, to data packet signals in a packet unit, and deliver each of the data packet signals to the transmission unit 240, and (iii) process the received data that has been stored in the buffer 251 of the reception unit 250, and deliver the processed data to the control unit 210.

The transmission unit 240 includes a buffer 241, and serves to accumulate therein the command packet signals, the data packet signals, and the like, which have been delivered from the processing unit 230, and deliver, to the switch unit 260, the signals accumulated in the buffer 241 sequentially.

The reception unit 250 includes the buffer 251 and the command signal queue 252, and serves to accumulate, in the buffer 251, the command packet signals, the data packet signals, and the like, which have been delivered from the switch unit 260, and deliver, to the processing unit 230, the signals accumulated in the buffer 251 sequentially. The command signal queue 252 serves to store the command packet signals. The maximum number of the command packet signals storable therein is three in this embodiment.

The switch unit 260 serves to execute switching of the communication scheme between full-duplex communication and half-duplex communication in compliance with the instruction of the control unit 210. In full-duplex communication, the switch unit 260 serves to route, to the channel 310, the signals that have been delivered from the transmission unit 240, and deliver, to the reception unit 250, the signals that have been received via the channel 300. Meanwhile, when transmitting data by half-duplex communication, the switch unit 260 serves to route, to the channels 300, 310, the data that has been delivered from the transmission unit 240, and when receiving data by half-duplex communication, the switch unit 260 serves to route, to the reception unit 250, the data that has been received via the channels 300, 310. The switch unit 260, in fact, comprises two pairs of transmission and reception paths. In the first pair, each of the transmission and reception paths is connected to the channel 300 at one end thereof, and the transmission path is connected to the transmission unit 240 and the reception path is connected to the reception unit 250 at the other end thereof. In the second pair, each of transmission and reception paths is connected to the channel 310 at one end thereof, and the transmission path is connected to the transmission unit 240 and the reception path is connected to the reception unit 250 at the other end thereof. Each path includes thereon a switching device, such as a transistor, that permits signals to pass according to the communication direction thereof, when power is supplied. The switch unit 260 switches between transmission and reception, by switching the power supply to the switching devices, that is to say, by providing the power supply to the switching devices for one direction and cutting the power supply to the switching devices for the other direction.

<Data>

Now, description will be made on the example data format of each signal that is communicated between the master 100 and the slave 200.

Figure 4:
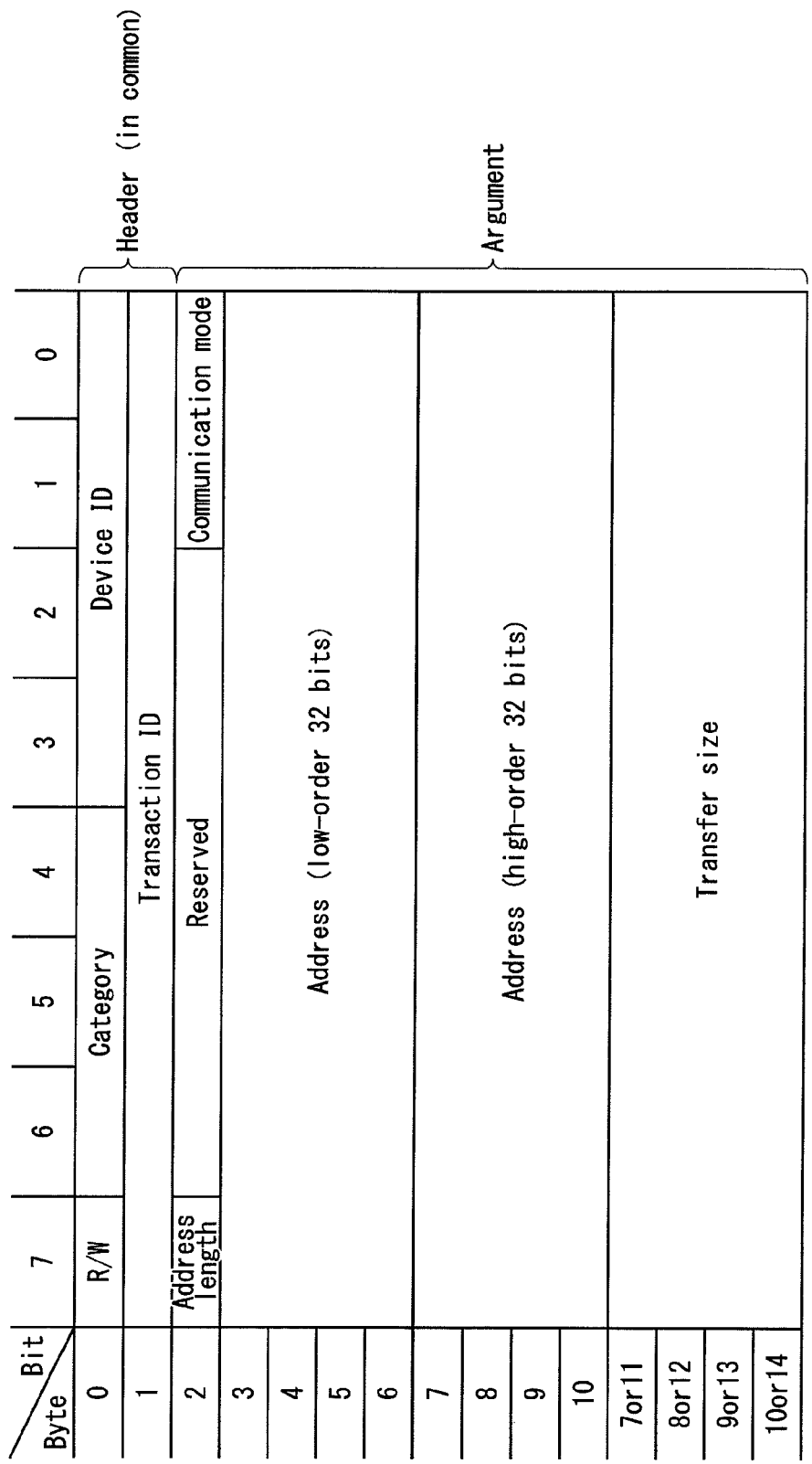
FIG. 4 shows an example data format of a command packet signal.

FIG. 4 shows an example data format of a command packet signal.

The command packet signal is the signal that the master 100 transmits to the slave 200 in order to request data transmission (to write data) or data reception (to read data).

In the command packet signal, the first 2 bytes are dedicated to a header, the header including "device ID" information in the top 4 bits, "category" information in the following 3 bits, "R/W" information in the following 1 bit, and "transaction ID" information in the following 8 bits.

The "device ID" information indicates the slave 200. In the present embodiment, the master 100 is connected only to the slave 200. However, when the master 100 is connected to a plurality of slaves, the "device ID" serves to indicate the destination of each command packet signal. Each receiving device or the slave, when the "device ID" indicates the own device's ID, executes processing on received command packet signals, and when the "device ID" does not indicate the own device's ID, deletes the received command packet signal.

The "category" shows various command packet signal types. The types indicated by the "category" include an "I/O command", a "memory command", a "response", "data", and a "message". The command packet signal herein means a memory command. Since the example data format shown in FIG. 4 applies to the command packet signal, the "category" herein is represented by "001" indicating that the signal is the command packet signal. In addition, the "I/O command" is represented by "000", the "memory command" is "001", the "response" is "010", the "data" is "011", the "message" is "111". The values from "100" to "110" forms a reserved area that is to be used when there occurs a need to define the packets of new types in the future.

The "R/W" shows whether the command packet signal requests to read data (R: Read) or to write data (W: Write). When requesting to read data, the "R/W" indicates "0", and when requesting to write data, the "R/W" indicates "1". Meanwhile, in the description below, the indication of data writing or data reading can be referred as an attribute.

The "transaction ID" identifies, when executing a plurality of transactions and when it is possible to execute each transaction processing, each transaction ID.

Then, the header is followed by an argument. The argument includes a 2-bit "communication mode", a 5-bit "reserved", and 1-bit information of an "address length" that indicates whether an address field has a size of 4 bytes or 8 bytes.

The "communication mode" shows whether data communication is to be performed by full-duplex communication or half-duplex communication. The "communication mode" indicates (i) "01", when specifying full-duplex communication, (ii) "10", when specifying half-duplex communication, and (iii) "11", when either full-duplex communication or half-duplex communication may be possible. In addition, "00" is to be used when there occurs a need to define a new communication mode in the future.

The "reserved" houses, when a new definition is included in the command packet signal, information of the definition. In the present embodiment, the "reserved" can house the information (FLASH) indicating that the master 100 is not to transmit a packet signal to the slave 200 any more in the immediate future, following the current packet signal.

The "address length" identifies whether a subsequent address field has a size of 4 bytes (32 bits) or 8 bytes (64 bits).

Then, the "address length" field is followed by "address" fields and a "transfer size" field.

Each "address" shows a memory address of the slave 200 that the master 100 requests to access.

The "transfer size" shows a transfer size of the data that the master 100 actually requests to transfer in data communication.

We have looked at the command packet signal so far.

Figure 5:
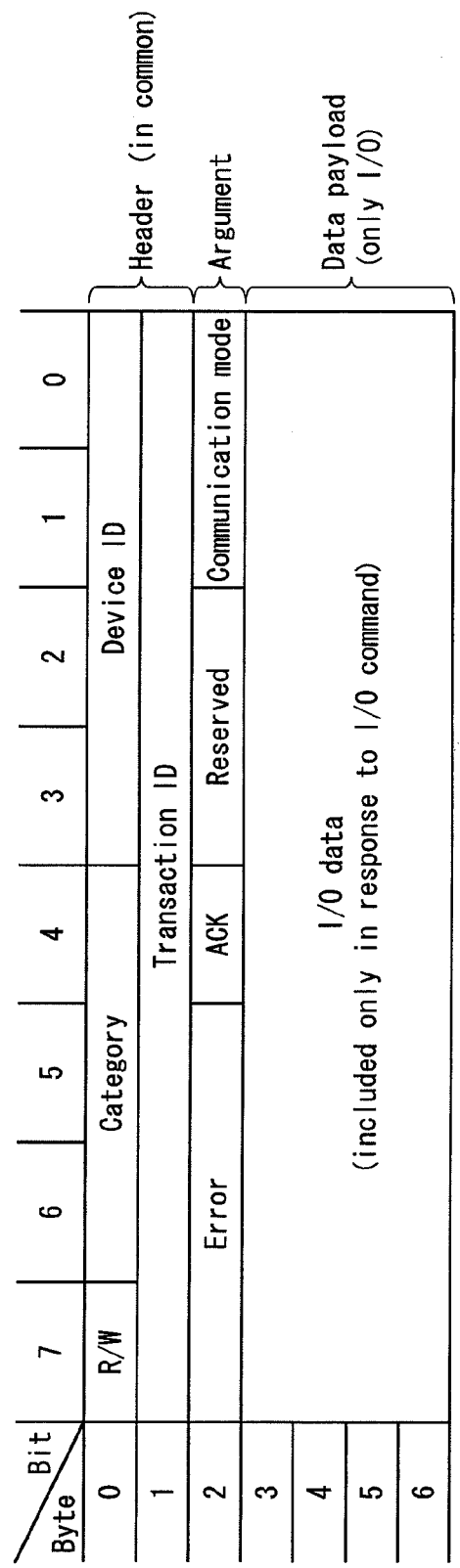
FIG. 5 shows an example data format of a response packet signal.

FIG. 5 shows an example data format of a response packet signal.

The response packet signal is a response signal to the command packet signal or the I/O command that has been received from the master 100. The master 100 receives the response packet signal from the slave 200, determines availability of data communication, and thereafter executes data communication.

As shown in FIG. 5, in the response packet signal, the first 2 bytes are dedicated to a header, the header including "device ID" information in the top 4 bits, "category" information in the following 3 bits, "R/W" information in the following 1 bit, and "transaction ID" information in the following 8 bits.

Like information included in the header denotes like information in the header of the command packet signal. Nevertheless, the category here indicates "010" showing that the signal is the response packet signal.

Then, the header is followed by an argument. In the response packet signal, the argument includes a 2-bit communication mode area, a 2-bit reserved area, a 1-bit ACK area, and a 3-bit error area.

The "communication mode" can denote various communication modes similar to the command packet signal.

The "reserved" is an area that is to be used when there occurs a need to house a new definition in the response packet signal.

The "ACK" bit indicates an ACK showing that the command packet signal has been properly received and that response is available, or a NACK showing that an error, such as an address error or a transfer size error, has occurred and that response is unavailable.

If the "ACK" bit indicates the NACK, then an "error" area follows, showing the detail of the error.

Meanwhile, when the response packet is a response signal to the I/O command, the argument is followed by a data payload follows. For example, the data payload includes data showing the number of the command packet signals storable in the command signal queue 252, as stored in the limit value storage unit 220.

We have looked at the response packet signal so far.

Figure 6:
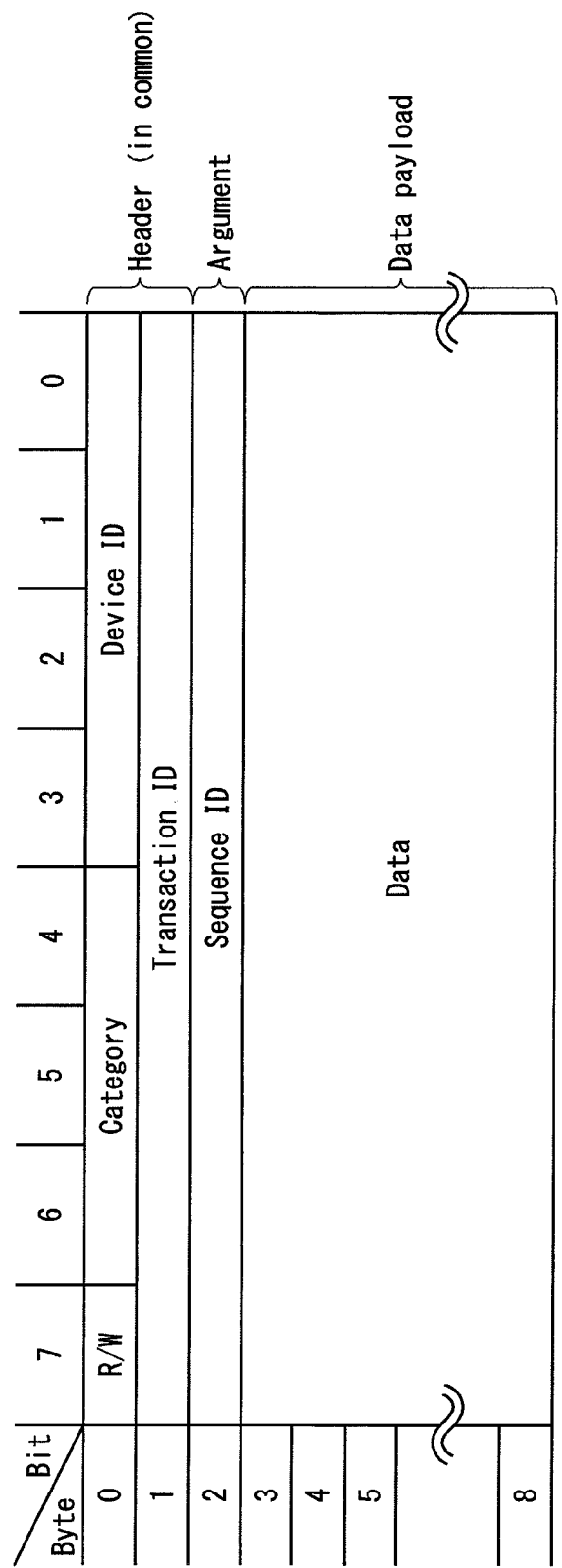
FIG. 6 shows an example data format of a data packet signal.

FIG. 6 shows an example data format of a data packet signal.

The data packet signal is a packet signal for transferring the actual data that the master 100 transmits to the slave 200 or that the slave 200 transmits to the master 100.

As shown in FIG. 6, in the data packet signal, the first 2 bytes are dedicated to a header, the header including "device ID" information in the top 4 bits, "category" information in the following 3 bits, "R/W" information in the following 1 bit, and "transaction ID" information in the following 8 bits.

Like information included in the header denotes like information in the header of the command packet signal. Nevertheless, the category here indicates "011" showing that the signal is the data packet signal.

The header is followed by an argument, and the argument in the data packet signal includes "sequence ID" information.

When the actual data that is to be transferred exceeds one packet, the data is divided into several packets to be transmitted and received, and so the "sequence ID" shows what number packet of the divided data the packet is.

Then, the argument is followed by a data payload, in which the actual data is stored.

We have looked at the data packet signal so far.

Meanwhile, the I/O command and the message packet will be described briefly below, for the I/O command and the message packet do not relate to the essence of the present embodiment.

The I/O command is a command that is used at connection or reset between the master 100 and the slave 200, and when communication protocol is set up, and is a command for accessing an I/O memory area of the slave 200. The I/O command is used when the master 100 is to acquire a processing capability of the slave 200, or determine a data volume for each packet in data communication. In the present embodiment, the master 100 also acquires, from the I/O data, the maximum number of the command packet signals storable in the command signal queue 252 of the slave 200, the I/O data being included in the response packet in response to the I/O command packet.

The message packets are used for executing other various controls between the master 100 and the slave 200. The message packets are used as, for example, an interruption assert notifying an interruption, a negate indicating that the interruption is de-asserted, a CRC error notifying an occurrence of a transmission error, an abort indicating an abortion of transfer, a power control for decreasing power consumption during an idle state, and a reset for initialization.

<Operations>

Now, the operations of the present embodiment will be described, with reference to flowcharts of FIGS. 7 and 8.

Figure 7:
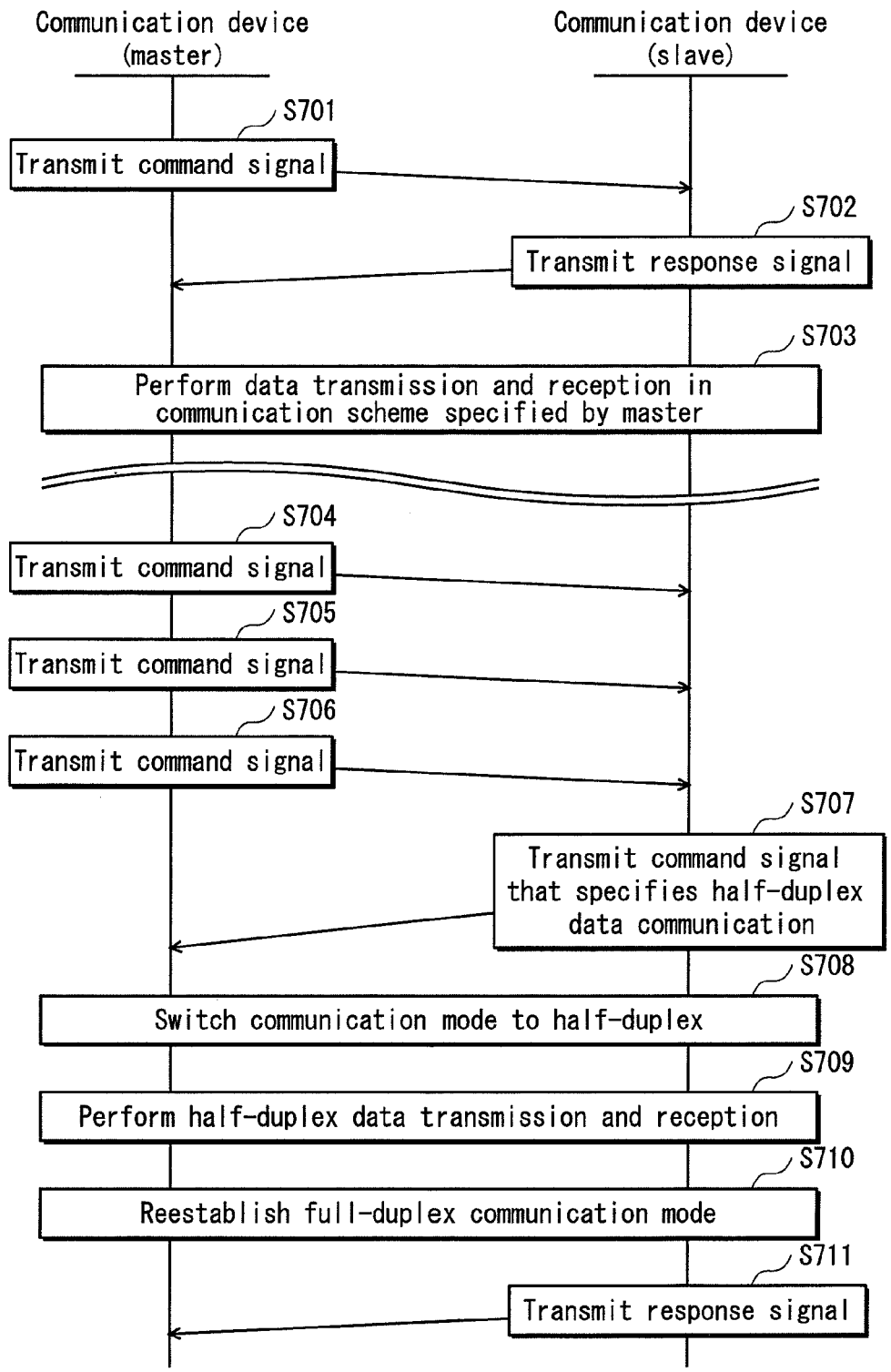
FIG. 7 is a timing chart showing communication between the master 100 and the slave 200.

FIG. 7 is a timing chart showing an example of the communication between the master 100 and the slave 200.

A normal data communication flow will be described with reference to Steps S701 to S703, and the communication flow in which the slave 200 transmits the response packet signal specifying half-duplex communication will be described with reference to Steps S704 to S711.

The master 100 transmits a command packet signal (Step S701). The slave 200 receives the command packet signal, generates a response packet signal, and transmits the generated response packet signal to the master 100 (S702).

Upon receiving the response packet signal from the slave 200, the master 100 compares the communication mode specified by the response packet signal with the communication mode specified by the command packet signal that was transmitted by the master 100 in Step S701. When the communication modes accord, the master 100 determines the specified communication mode as the communication mode, and when the communication modes do not accord, the master 100 determines the communication mode depending on a predetermined priority level. The master 100 then notifies the determined communication mode to the slave 200, receives an acknowledge signal from the slave 200 in response to the notification of the communication mode, and thereafter performs actual data communication (Step S703).

The master 100 transmits another command packet signal to the slave (Step S704). The transmitted command packet signal is stored in the command signal queue 252 of the slave 200. Here, it is assumed that, before the command packet signal is stored, all the data communication corresponding to each command packet signal that had been accumulated in the command signal queue 252 has come to an end.

The master 100 transmits yet another command packet signal to the slave (Step S705). The transmitted command packet signal is also stored in the command signal queue 252 of the slave 200.

The master 100 transmits yet another command packet signal to the slave (Step S706). The transmitted command packet signal is also stored in the command signal queue 252 of the slave 200.

At this point, the number of the command packet signals stored in the command signal queue 252 has reached the maximum number storable therein, that is, three.

Thus, it is no longer possible for the slave 200 to receive a command packet signal from this point. At this point, performing half-duplex communication does not cause any interference for the slave 200. Accordingly, the slave 200 houses a specification of half-duplex communication in a response packet signal in response to the command packet signal received in Step S704, and transmits the response packet signal to the master 100 (Step S707).

Since the number of the command packet signals, which have been transmitted by the master 100 and whose corresponding data communication has not yet been executed, has reached the maximum number of the command packet signals as stored in the limit value storage unit 120, the master 100, upon receiving the response packet signal specifying half-duplex communication from the slave 200, switches the communication mode to half-duplex communication. The slave 200 also switches the communication mode to half-duplex communication, upon transmitting the response packet signal (Step S708).

Subsequently, the master 100 and the slave 200 perform data communication by half-duplex communication (Step S709).

The master 100 and the slave 200, once data communication corresponding to one of the command packet signals comes to an end, reestablish the full-duplex communication scheme (Step S710).

Then, the slave 200 transmits another response signal in response to the command packet signal that was received in Step S705 (Step S711), and executes a subsequent processing.

Now, description will be made on the operations of the slave 200.

Figure 8:
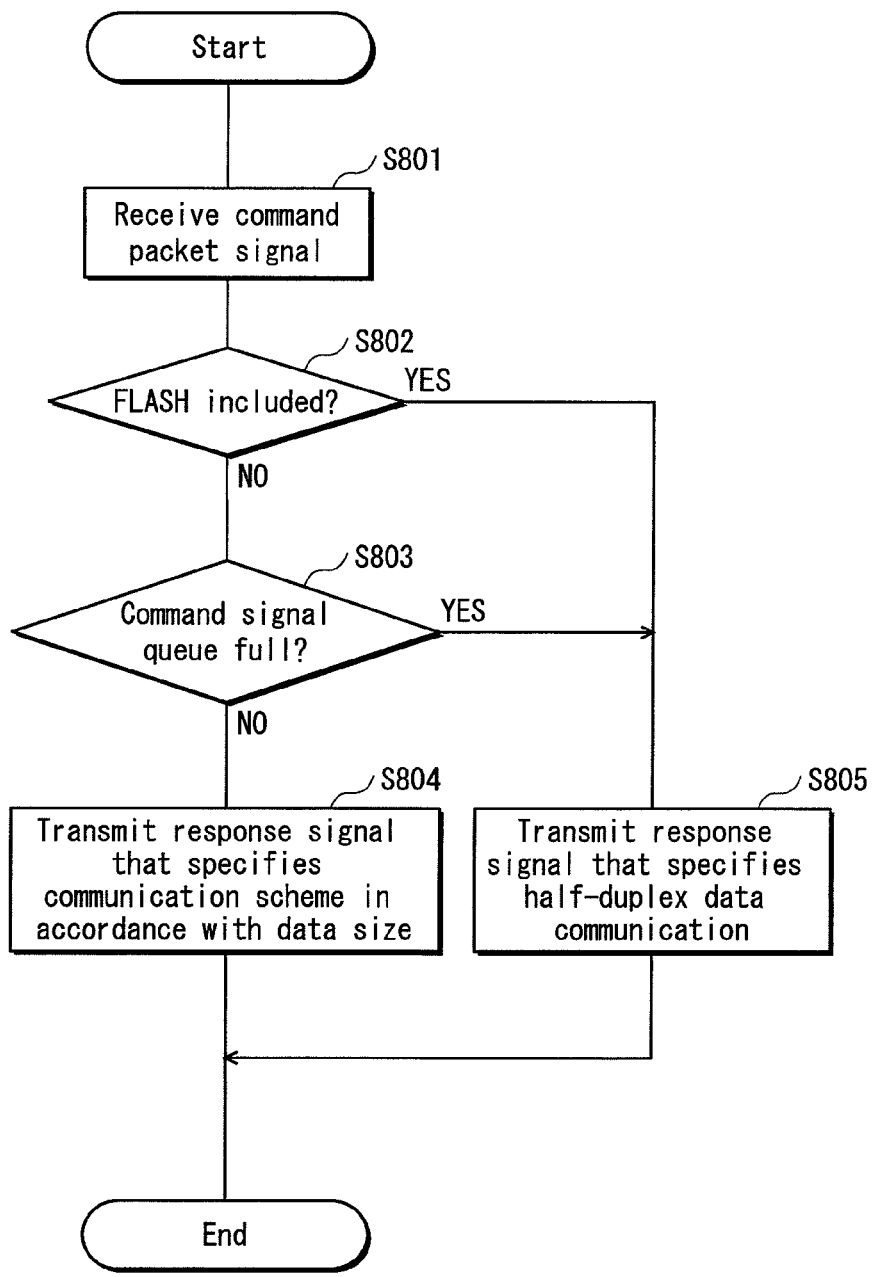
FIG. 8 is a flowchart showing the operations of the slave 200 when receiving the command packet signal.

FIG. 8 is a flowchart showing the operations of the slave 200 from when the slave 200 receives the command packet signal to when the slave 200 transmits the response packet signal.

As shown in FIG. 8, the slave 200 receives, from the master 100, the command packet signal via the channel 300, and the switch unit 260 of the slave 200 delivers the received command packet signal to the reception unit 250. The reception unit 250 stores the command packet signal delivered from the switch unit 260 in the command signal queue 252 (Step S801).

Thereafter, processing unit 230 detects the reserved area of the received command packet signal, and determines whether the FLASH information is inserted therein (Step S802).

When the FLASH is not inserted in the command packet signal (NO in Step S802), the processing unit 230 determines whether the number of the command packet signals stored in the command signal queue has reached the maximum (Step S803).

When the command signal queue 252 is not full (NO in Step S803), the communication mode selection unit 212 determines one of (i) full-duple communication, (ii) half-duplex communication, or (iii) either full-duplex communication or half-duplex communication is possible. The determination depends on the data size as specified by the transfer size in the command packet signal, the receive buffer 251 capacity, and the processing capability of the processing unit 230. The processing unit 230 generates a response packet signal whose "communication mode" is set to indicate the communication scheme as determined by the communication mode selection unit 212, and transmits the generated response packet signal to the master 100 (Step S804).

On the other hand, when the FLASH is inserted in the command packet signal (YES in Step S802), or when the command signal queue 252 is full (YES in Step S803), the processing unit 230 generates a response packet signal that specifies half-duplex communication as the communication mode, and transmits the generated response packet signal to the master 100.

After the processing unit 230 transmits the response packet signal that specifies half-duplex communication, the switch unit 260 switches the communication scheme to half-duplex communication, and performs data communication as specified by the transaction ID in the transmitted response packet signal.

We have looked at the operations of the slave 200 from when the slave 200 receives the command packet signal to when the slave 200 transmits the response packet signal.

Meanwhile, upon receiving the response packet signal, the master 100 detects whether the number of the command packet signals, which have been transmitted by the own device and whose corresponding data communication has not yet been executed, equals to the number of the command packet signals that is stored in the limit value storage unit 120, and performs data communication as specified by the response packet signal by half-duplex communication.

As mentioned above, the communication system of the present invention is for performing data communication, while switching between full-duplex communication and half-duplex communication. In the communication system, when the number of the command packet signals transmitted from the master 100 to the slave 200 has reached the maximum number storable in the command signal queue 252, the communication scheme is switched to half-duplex communication, and thereafter communication is performed.

In the communication system according to the present embodiment, half-duplex communication is performed all the time when the number of the command packet signals held in the command signal queue 252 of the slave 200 has reached the maximum number that may be stored in the command signal queue 252. Normally, on the other hand, full-duplex communication and half-duplex communication are used as a communication state demands, so that a data flow in a receive buffer during data transfer may not occur. When the number of the command packet signals held in the command signal queue 252 of the slave 200 has reached the maximum number, the command signal queue 252 may not receive a command packet signal any longer. Therefore, there is less need for the channel 300 to be secured as the transmission path for the command packet signals. By switching from full-duplex communication to half-duplex communication in such a case, the present communication system makes it possible to increase data transfer volume in data communication, therefore to shorten data transfer time. Accordingly, the present communication system is advantageous particularly when the master 100 reads information that is held by the slave 200, that is to say, when performing half-duplex communication in the direction opposite to the transmission direction of the command packet signals.

Second Embodiment

<Outline>

In the second embodiment which will be described below, switch frequency is reduced as much as possible. In the first embodiment, it was shown that each data communication as specified by each command packet was executed in order of reception of the command packet signal. On the other hand, in this embodiment, each data communication is executed in out of order, that is to say, without relation to the order in which each command packet signals has been received.

In other words, with respect to data read and write operations as requested by command packet signals that have been accumulated in the command signal queue, all the read operations are executed first and all the write operations are executed later, or all the write operations are executed first and all the read operations are executed later. This allows to reduce the switch frequency of the communication direction. Thus, it will be shown, that the order of execution of each data communication is changed in the second embodiment.

<Structure>

Since the communication system in the second embodiment has the structure same as the communication system of the first embodiment, description will be omitted.

As for the slave 200, however, differing from the first embodiment, the slave 200 in the second embodiment serves to change the execution order of each data communication that is specified by each of the received command packet signals.

More specifically, when the number of the command packets stored in the command signal queue 252 has reached the maximum number, or when the slave 200 receives the command packet signal in which the FLASH is inserted, the slave 200 changes the order of each command packet signal stored in the command signal queue 252 depending on the signal's attribution, that is to say, whether the signal requests to write data or read data.

FIG. 9 shows an example of the order change of the command packet signals.

As shown in FIG. 9A, it is assumed that the command packet signals 901, 902, 903, 904, 905 were received in the described order. Note that the number of the command packet signals storable in the command signal queue 252 is set "5" in the example herein. In FIG. 9, the command that requests to read data is represented by a "CMD_R", and the command that requests to write data is represented by a "CMD_W".

In the second embodiment, the processing unit 230 also changes the order of each command packet signal stored in the command signal queue 252.

Since the command packet signal 901 that was stored first in the command signal queue 252 is a signal that requests to write data in the example herein, it is assumed that the command packet signals that request to write data are to take priority. The processing unit 230 changes the order of execution of data communication in order of the command packet signals 901, 904, 902, 903, 905, as shown in FIG. 9 B.

This enables all the data communication in the same direction to be performed collectively, thereby reducing the time lag caused by the switching of the communication direction.

In this way, by changing the order of the command packet signals, it becomes possible to reduce the switch frequency of the communication scheme during data communication. When executing a plurality of operations of data communication as specified by a plurality of command packet signals, it is possible to change the execution order and cause all the data communication having the same attribution to be executed continuously, thereby shortening the time required for the data communication.

<Operations>

Figure 10:
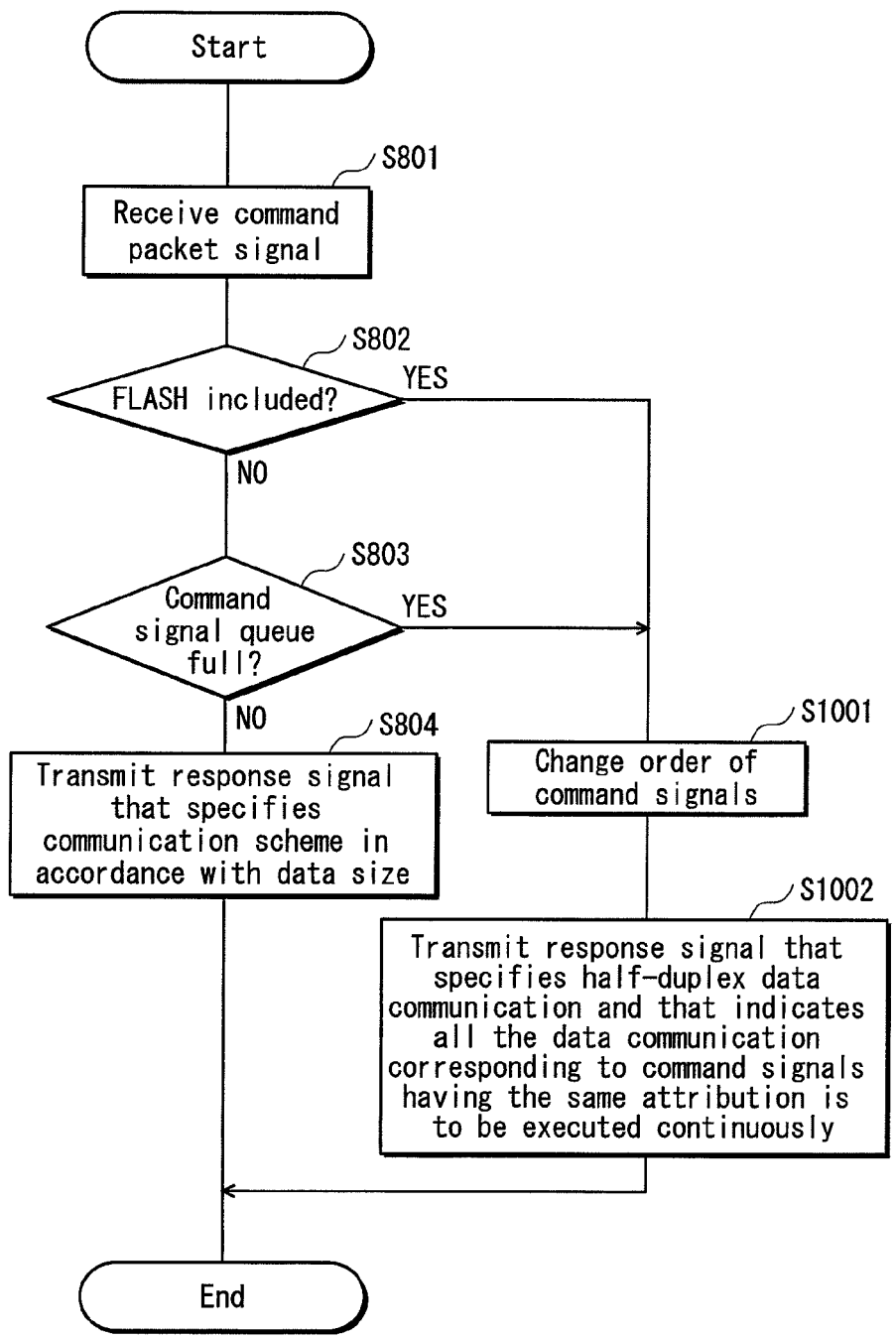
FIG. 10 is a flowchart showing the operations of the slave 200 when receiving the command packet signal according to the second embodiment.

FIG. 10 is a flowchart showing the flow of the operations of the slave 200 in the second embodiment. It can be seen, when compared with FIG. 8, that the second embodiment differs in Step S805 of the first embodiment.

Therefore, description will be made on Steps S1001, S1002 that are executed instead of Step S805. Since the operations in other Steps are similar to those in FIG. 8, description will be omitted.

When the FLASH is inserted in the command packet signal (YES in Step S802), or when the command signal queue is full (YES in Step S802), the slave 200 changes the order of each command packet signal stored in the command signal queue 252. The processing unit 230 detects whether the command packet signal that was stored first in the command signal queue 252 requests to write data or read data, and changes the order of each command packet signal so that the detected attribution is to take priority (Step S1001).

The slave 200 then generates a response signal that specifies half-duplex data communication as the communication mode and that contains information indicating that all the data communication having the same attribution is to be executed continuously, and transmits the generated response signal to the master 100 (Step S1002). In the example of FIG. 9B, the response signal herein corresponds to the signal in response to the command packet signal 901. The slave 200 continuously transmits another response packet signal having the same attribution (in the example of FIG. 9B, the response signal herein corresponds to the signal in response to the command packet signal 904). Subsequently, the slave 200 switches the communication scheme to half-duplex communication, and performs actual data communication by half-duplex scheme in thus changed order.

The master 100 (i) receives the response packet signal, (ii) detects that it is half-duplex communication that the response packet signal specifies and that the number of the command packet signals stored in the command signal queue 252 has reached the maximum number, (iii) switches the communication scheme to half-duplex communication, and (iv) performs data communication specified by the transaction ID of the response packet signal.

As described so far, if it is permitted to change the execution order of each data communication specified by each command packet signal, the present embodiment changes the order to reduce the switch frequency of the direction in which data communication is performed (i.e. the master 100 transmits data to the slave 200, or the slave 200 transmits data to the master 100), and thereafter performs data communication. This allows to reduce the switching frequency of the communication direction, thereby raising the overall data communication rate.

Third Embodiment

In the third embodiment, description will be made on a concrete example of the communication devices shown in the above first embodiment. The communication devices of the first embodiment are used, for example, in communication between an SD card reader and an SD card.

The master 100 in the first embodiment corresponds to the SD card reader, and the slave 200 corresponds to the SD card.

Figure 11:
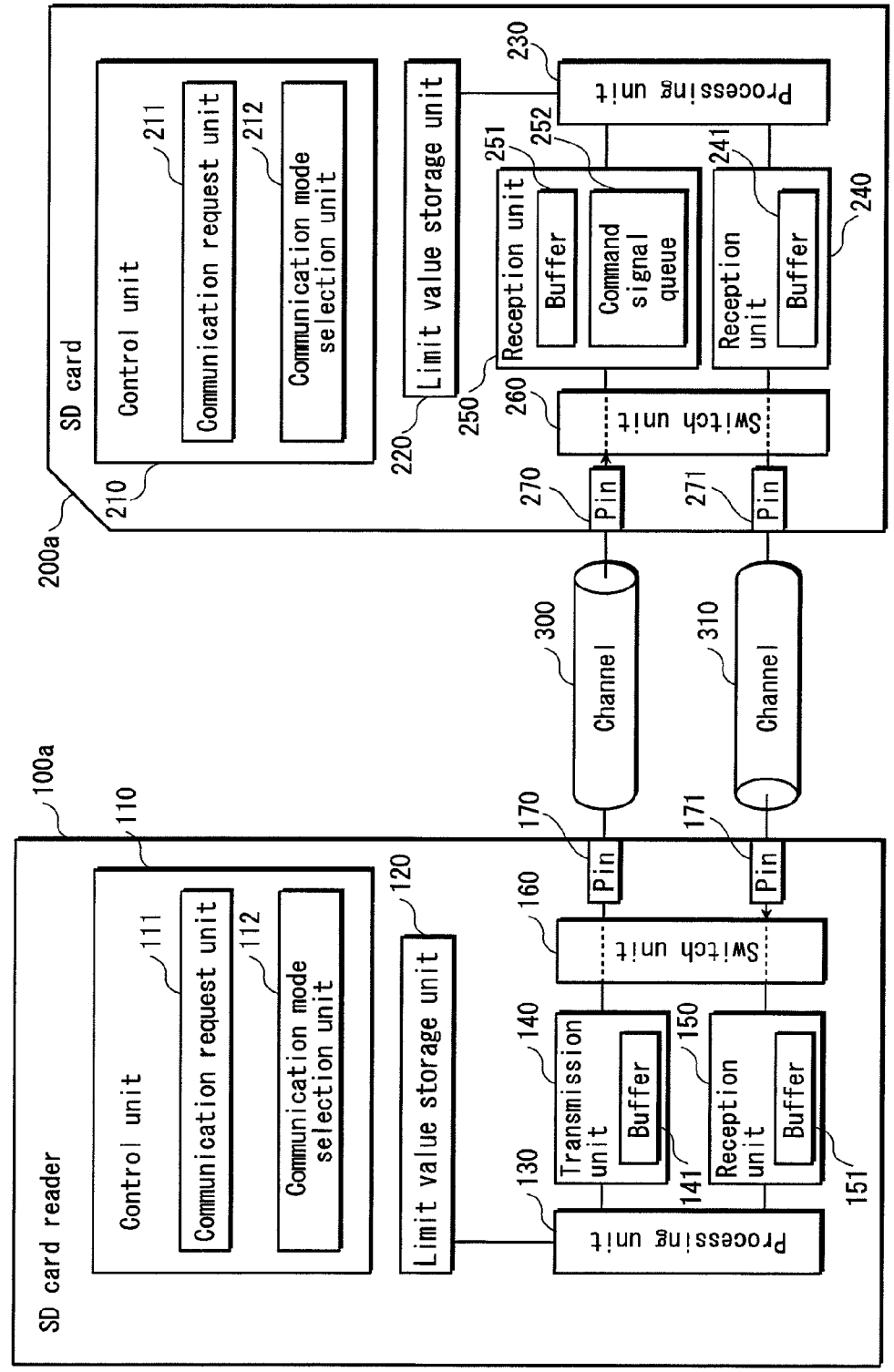
FIG. 11 shows a structure of the communication system according to the third embodiment.

FIG. 11 shows such a usage example.

As shown in FIG. 11, the communication system of the third embodiment includes the SD card reader and the SD card. The SD card reader is an SD card loadable device and serves as an interface that reads data haled in the SD card or writes additional data in the SD card.

In the description below, like functional parts represented by the same appellations and numerals as the master 100 and the slave 200 of the above embodiment denote like functional parts, and description will be omitted.

As is not shown, the SD card reader 100a is, for example, connected to or built in a PC, receives instructions from the PC, and transmits the data that was read from the SD card 200a to the PC or writes data in the SD card 200a.

The channels 300, 310 are left in FIG. 11 in order to make it easy to understand a correspondence relation to the communication system of the first embodiment. In fact, however, a pin 170 and a pin 270, and a pin 171 and a pin 271 are directly connected to form the channels 300, 310 respectively.

In such a configuration as well, as shown in the first embodiment, the SD card reader 100a and the SD card 200a switch the communication scheme between full-duplex communication and half-duplex communication. In this case, the switching is as follows: the SD card reader 100a and the SD card 200a switch the communication scheme from full-duplex communication to half-duplex communication, and thereafter perform data transfer, when (i) the number of the command packet signals stored in the command signal queue 252 has reached the maximum number, and (ii) the SD card reader 100a and the SD card 200a are performing full-duplex communication.

<Supplementary Description>

Although the description has been made on some methods of the present invention as shown in the above embodiments, it is natural that the present invention is not limited to these embodiments. Now, various modifications within the concept of the present invention other than those described as the above embodiments will be looked at.

(1) In the first embodiment, it was shown that, once the slave 200 receives the command packet signals until the command signal queue 252 becomes full, (i) the slave 200 transmits, to the master 100, a response packet that specifies half-duplex communication as the communication mode, (ii) upon receiving the response signal, the master 100 automatically switches to the half-duplex communication scheme, and (iii) thereafter data communication is performed (refer to FIG. 7, Steps S708 and S709). However, present invention may be implemented by the following method as well.

As shown in Step S703 in FIG. 7, when receiving the response packet signal containing the information that specifies half-duplex communication, the master 100 may notify that the communication scheme is to be switched to half-duplex communication, receive an acknowledge signal in response to the notification in order to switch to half-duplex communication, and thereafter perform data communication.

(2) In the above embodiments, the master 100 stores the maximum number of the command packet signals storable in the command signal queue 252 of the slave 200. Yet, it is also possible that the master 100 acknowledges that the number of the command packet signals in the command signal queue 252 has reached the maximum number, by receiving the response packet signal indicating that the number of the command packet signals, which have been stored in the command signal queue 252 and whose corresponding data communication has not yet been executed, has reached the maximum. In this case, it is possible to house, in the reserved area of the response packet signal that is to be transmitted to the master 100, some information indicating that the command signal queue 252 is full, when the command signal queue 252 becomes full. Or, it is also possible to notify the master 100 that the command packet signal has not been successfully received by means of the NACK.

(3) In the order change of the command packet signals in the above second embodiment, the command packet signal that was stored first in the command packet queue 252 is to take priority. However, the order may be changed in accordance with a predetermined priority.

For example, it may be predetermined that data writing is to take priority. In this case, the processing unit 230 changes the order so that the command packet signals 902, 903, 905, 901, 904 lines in the described order, as shown in FIG. 9C.

(4) In the second embodiment, the response packet signal is caused to include the information indicating that all the data communication corresponding to the command packet signals having the same attribution is to be executed continuously and collectively. Instead, however, it is also possible to cause all the response packet signals in response to the command packet signals having the same attribution to be transmitted to the master 100 continuously and collectively. In this case, the master 100 continues to perform the data communication as specified by the received response packet signals without switching the communication scheme, as long as the received response packet signals have the same attribution.

Further, although each data communication is executed continuously, it is also possible to execute data communication corresponding to one command packet signal, and subsequently reestablish full-duplex communication once, so that the slave 200 may receive a new command packet signal.

(5) Although not described specifically in the above embodiments, it is also contemplated that each command packet signal accumulated in the command signal queue 252 is deleted as the corresponding data communication is executed. Alternately, it is possible to set, in each command packet signal, a flag indicating whether the corresponding data communication has been already executed, and overwrite, for each command packet signal whose corresponding data communication has been executed, with a new command packet signal without deleting. Meanwhile, in the case where each command packet signal is not deleted, the slave 200 judges whether the number of the command packet signals has reached the maximum number, by counting the number of the command packet signals that hold the flags indicating the corresponding data communication has not been executed, and seeing whether the counted number has reached the maximum number.

(6) Although not described specifically in the above embodiments, the slave 200 may be replaced with the master 100 in performing data communication.

(7) The switching in the switching unit 160, 260 as shown in the above embodiments explains merely one method, and various other switching methods may be possible. As far as it is possible to switch between full-duplex communication and half-duplex communication, any switching method may be adopted.

As an example, the following method may be possible other than that of the first embodiment. Firstly, the transmission and reception units of the master and the slave are configured to acknowledge which communication scheme a current communication scheme is. Then, (i) during half-duplex transmission, the transmission unit transmits data via the both channels, (ii) during half-duplex reception, the reception unit receives data via the both channels, and (iii) during full-duplex communication, the transmission unit receives data via only one channel (the channel 300, for example), and the reception unit receives data via only the other channel (the channel 310, for example), the reception unit not transferring data to the processing unit even if data is received via the channel 300, that is to say, performing filtering.

(8) Although it is shown, in the above third embodiment, that the SD card reader 100a and the SD card 200a each include only two pins, the number of the pins may be varied as long as there are two or more pins. Generally, the SD card includes 9 pins, and the mini SD card (registered trademark) includes 11 pins. At least two of those pins should be used to perform communication while switching between full-duplex communication and half-duplex communication, and three or more pins may be used for data transfer.

Meanwhile, although the SD card is described as an example in the third embodiment, the SD card can be any type of an I/O memory card. Accordingly, the SD card reader may be replaced with a card reader that is able to access the I/O memory card.

(9) It is assumed, in the above embodiments, full-duplex data communication using serial transfer is performed on each of the channels 300, 310. In half-duplex communication, the serial transfer may be switched to a differential signal transfer. When reestablishing full-duplex communication, the differential signal transfer may be switched to the serial transfer again. This allows to further raise the data transfer rate in half-duplex communication.

(10) In the first embodiment, the master 100 may transmit a command packet signal that specifies half-duplex communication as the communication mode, when (i) the command packet signal, which is to be transmitted, and (ii) the command packet signals, which have been transmitted and whose corresponding data communication has not been executed, total to the maximum number stored in the limit value storage unit 120.

(11) Each functional part of the master 100 or the slave 200 in the above embodiments may be implemented in the form of one or more LSIs (Large Scale Integrations), and a plurality of the functional parts may be implemented in the form of an LSI.

Furthermore, the integration of circuits is not limited to being realized with LSI, but may be realized with a special-purpose circuit or a general-use processor. Alternatively, the integration may be realized with use of an FPGA (field programmable gate array) that is programmable after manufacturing of the LSI, or a re-configurable processor in which connection or setting of circuit cells in the LSI is re-configurable. Naturally, due to advances in or derivations from semiconductor technology, if an advent of new integration circuit technologies replaces LSIs, the functional parts could be integrated with use of any of those technologies. Biotechnology is one possible application.

(12) It is also possible to have the following control program stored in a storage medium, or circulated and distributed through various communication channels: the control program comprising program codes for causing the processors in the communication devices or the circuits which are connected thereto to execute the communication operations and the communication scheme switching processing as described in the above embodiments. Such a storage medium includes an IC card, a hard disk, an optical disk, a flexible disk, and a ROM. The circulated and distributed control program becomes available as it is contained in a memory and the like which can be read by a processor. The control program is then executed by the processor, so that the various functions as described in the embodiments will be realized.

The present application is useful in the data communication system in which the master and the slave each specify either the full-duplex communication scheme or the half-duplex communication scheme to perform data communication, allowing half-duplex communication to be selected appropriately and improving data communication efficiency.

REFERENCE SIGNS LIST

100: communication device (master)
100a: SD card reader
110, 210: control unit
111, 211: communication request unit
112, 212: communication mode selection unit
120, 220: limit value storage unit
130, 230: processing unit
140, 240: transmission unit
141, 151, 241, 251: buffer
150, 250: reception unit
160, 260: switch unit
170, 171, 270, 271: pin
200: communication device (slave)
200a: SD card
300, 301: channel

The invention claimed is:

1. A communication system that includes first and second communication devices for performing full-duplex communication and half-duplex communication with each other via a handshaking procedure, wherein
the first communication device includes:
(i) a command signal transmission unit operable to transmit a command signal for requesting data communication to the second communication device via a channel, which is used for data transmission from the first to second communication device in full-duplex communication, and
(ii) a first data communication unit operable to receive, from the second communication device, a response signal in response to the command signal, and perform data communication according to a communication scheme specified by the response signal,
the second communication device includes:
(i) a command signal storage unit that stores therein each command signal transmitted from the first communication device and that has a maximum number of command signals storable therein,
(ii) a response signal transmission unit operable to transmit a response signal that specifies either a full-duplex communication scheme or a half-duplex communication scheme, and
(iii) a second data communication unit operable to perform data communication,
wherein the response signal transmission unit transmits the response signal that specifies the half-duplex communication scheme, when the number of the command signals, which have been stored in the command signal storage unit and whose corresponding data communication has not been executed, has reached the maximum number.

2. The communication system of claim 1, wherein
the first communication device further includes a hold unit that holds the maximum number, and
the first data communication unit performs half-duplex data communication, when (i) the number of the command signals, which have been transmitted from the command signal transmission unit and whose corresponding data communication has not been executed, equals to the maximum number, and (ii) receiving the response signal that specifies half-duplex communication in response to one of the command signals.

3. The communication system of claim 1, wherein
the first communication device further includes:
a hold unit that holds the maximum number, and
an instruction signal transmission unit operable to transmit an instruction signal that instructs the first and second communication devices to perform half-duplex data communication, when (i) the number of the command signals, which have been transmitted from the command signal transmission unit and whose corresponding data communication has not been executed, equals the maximum number, and (ii) receiving the response signal that specifies the half-duplex communication scheme in response to one of the command signals,
the second communication device further includes an acknowledge signal transmission unit operable to transmit an acknowledge signal indicating that the second communication device approves to perform data communication in the communication scheme specified by the instruction signal, and
upon receiving the acknowledge signal, the first data communication unit performs data communication in the specified communication scheme, and
upon transmitting the acknowledge signal, the second data communication unit performs data communication in the specified communication scheme.

4. The communication system of claim 1, wherein
the command signal transmission unit stores a prescribed information in the command signal that is to be transmitted, and
upon receiving the command signal containing the prescribed information, the response signal transmission unit transmits the response signal that specifies the half-duplex communication scheme, even when the number of the command signals stored in the command signal storage unit has not reached the maximum number.

5. The communication system of claim 4, wherein
the command signal transmission unit stores the prescribed information in the command signal that is to be transmitted, when there exists no other command signal that remains to be transmitted.

6. The communication system of claim 1, wherein
the command signal is either a data read request signal or a data write request signal, and
the second data communication unit executes data communication that corresponds to either data read request command signals or data write request command signals continuously, without relation to an order of storage of the command signals.

7. A communication device that perform data transmission and reception with another device, while switching between full-duplex communication and half-duplex communication, comprising:
a command signal transmission unit operable to transmit a command signal for requesting data communication to the second communication device via a channel, which is used for data transmission from the first to second communication device in full-duplex communication;
a limit value acquisition unit operable to acquire information of a maximum number of command packet signals storable in the other device; and
a data communication unit operable to receive, from the second communication device, a response signal in response to the command signal, and perform data communication according to a communication scheme specified by the response signal,
wherein the command signal transmission unit stores, in the command signal, information that specifies a half-duplex communication scheme, when the number of the command signals, which have been transmitted from the command signal transmission unit and whose corresponding data communication has not been executed by the data communication unit, has reached the maximum number.

8. A communication device that perform data transmission and reception with another device, while switching between full-duplex communication and half-duplex communication, comprising:
a command signal storage unit that stores therein each command signal transmitted from the other device and that has a maximum number of command signals storable therein;
a response signal transmission unit operable to transmit a response signal that specifies either a full-duplex communication scheme or a half-duplex communication scheme; and
a second data communication unit operable to perform data communication,
wherein the response signal transmission unit transmits the response signal that specifies the half-duplex communication scheme, when the number of the command signals, which have been stored in the command signal storage unit and whose corresponding data communication has not been executed, has reached the maximum number.

9. A communication method in a communication system that includes first and second communication devices for performing full-duplex communication and half-duplex communication via a handshaking procedure, comprising:
transmitting a command signal for requesting data communication from the first to the second communication device via a channel, which is used for data transmission from the first to second communication device in full-duplex communication;
storing each command signal transmitted from the first communication device in a command signal storage unit that stores therein each command signal received by the second communication device and that has a maximum number of command signals storable therein;
transmitting, in response to the command signal, a response signal that specifies either a full-duplex communication scheme or a half-duplex communication scheme; and
receiving a response signal in response to the command signal, and performing data communication according to a communication scheme specified by the response signal,
wherein in the response signal transmitting step, the response signal that specifies the half-duplex communication scheme is transmitted, when the number of the command signals, which have been stored in the command signal storage unit and whose corresponding data communication has not been executed, has reached the maximum number.

10. The communication system of claim 1, performing master-slave communications, wherein,
the first communication device is a master device, and
the second communication device is a slave device.

* * * * *